(12) United States Patent
Titus et al.

(10) Patent No.: US 12,206,600 B1
(45) Date of Patent: Jan. 21, 2025

(54) NETWORK SWITCHING UNIT CONFIGURATION

(71) Applicant: Marvell Asia Pte, Ltd., Singapore (SG)

(72) Inventors: Tony Devadason Titus, Pleasanton, CA (US); Vijay Vyas Mohan, San Jose, CA (US); Sen Narayanan Dharmadas, San Jose, CA (US); Chaitanya Tikku, Castro Valley, CA (US)

(73) Assignee: Marvell Asia Pte Ltd, Singapore (SG)

( * ) Notice: Subject to any disclaimer, the term of this patent is extended or adjusted under 35 U.S.C. 154(b) by 609 days.

(21) Appl. No.: 17/553,027

(22) Filed: Dec. 16, 2021

(51) Int. Cl.
| | |
|---|---|
| *H04L 49/35* | (2022.01) |
| *H04B 1/40* | (2015.01) |
| *H04L 47/80* | (2022.01) |
| *H04L 49/00* | (2022.01) |
| *H04L 49/20* | (2022.01) |

(52) U.S. Cl.
CPC .............. *H04L 49/35* (2013.01); *H04B 1/40* (2013.01); *H04L 47/803* (2013.01); *H04L 49/20* (2013.01); *H04L 49/3027* (2013.01)

(58) Field of Classification Search
CPC ....... H04L 49/35; H04L 47/803; H04L 49/20; H04L 49/3027; H04B 1/40
See application file for complete search history.

(56) References Cited

U.S. PATENT DOCUMENTS

| | | | | |
|---|---|---|---|---|
| 7,193,994 | B1 * | 3/2007 | Payson ..................... | H04L 7/02 370/380 |
| 7,852,781 | B1 * | 12/2010 | Felton ..................... | H04L 41/12 375/220 |
| 8,302,137 | B2 * | 10/2012 | Cagno ............... | H04L 25/03878 725/127 |
| 10,235,315 | B2 * | 3/2019 | Kishi ................ | H04L 25/03878 |
| 2005/0111536 | A1 * | 5/2005 | Cranford, Jr. ......... | H04L 25/068 702/69 |
| 2005/0281343 | A1 * | 12/2005 | Hsu .................... | H04L 25/03343 375/257 |
| 2009/0187807 | A1 * | 7/2009 | Narasimha .......... | H03M 13/353 714/761 |
| 2009/0316727 | A1 * | 12/2009 | Huang .................. | H04L 7/0058 370/488 |
| 2010/0329319 | A1 * | 12/2010 | Dai .................... | G01R 31/3171 375/224 |

(Continued)

*Primary Examiner* — Ayaz R Sheikh
*Assistant Examiner* — Tarell A Hampton

(57) ABSTRACT

Port parameters corresponding to a port of a network switching unit are received at one or more processing chips in the network switching unit. Both (i) serializer/deserializer (SerDes) parameters corresponding to the port, and (ii) transceiver parameters corresponding to the port, are obtained from a local storage based on the port parameters by the one or more processing chips. Signal processing operations of a SerDes unit are configured by the one or more processing chips using the SerDes parameters. The transceiver parameters are provided to a local platform of the network switching unit, for configuration, using the transceiver parameters, of a transceiver communicatively coupled to the port. The signal processing operations are performed by the SerDes unit, according to the SerDes parameters, on a signal received at the SerDes unit from the transceiver or on a signal transmitted from the SerDes unit to the transceiver.

20 Claims, 8 Drawing Sheets

(56) References Cited

U.S. PATENT DOCUMENTS

| | | | |
|---|---|---|---|
| 2013/0089122 A1* | 4/2013 | Lin | H04L 25/03885 375/219 |
| 2014/0025846 A1* | 1/2014 | Miyauchi | H04L 25/03 710/11 |
| 2015/0124580 A1* | 5/2015 | Rao | H04N 1/4005 370/216 |
| 2018/0004618 A1* | 1/2018 | Hirano | G06F 11/221 |
| 2022/0255248 A1* | 8/2022 | Chou | H01R 12/58 |

* cited by examiner

NETWORK SWITCHING UNIT CONFIGURATION

FIELD OF THE DISCLOSURE

The present disclosure relates to network switches that include connection ports.

BACKGROUND

Network switching units such as routers and bridges connect devices in and between computing networks. For wired transmission, cables are connected to ports of a network switching unit, and transceivers inside the network switching unit receive signals at the ports and convey signals out of the ports. One or more serializer/deserializer (SerDes) units inside the network switching unit convert input and/or output signals between serial and parallel formats.

SUMMARY

In one aspect, the present disclosure describes a computer-implemented method. According to the method, port parameters corresponding to a port of a network switching unit are received at one or more processing chips in the network switching unit. Both (i) serializer/deserializer (SerDes) parameters corresponding to the port, and (ii) transceiver parameters corresponding to the port, are obtained from a local storage based on the port parameters by the one or more processing chips. Signal processing operations of a SerDes unit are configured by the one or more processing chips using the SerDes parameters. The transceiver parameters are provided to a local platform of the network switching unit, for configuration, using the transceiver parameters, of a transceiver communicatively coupled to the port. The signal processing operations are performed by the SerDes unit, according to the SerDes parameters, on a signal received at the SerDes unit from the transceiver or on a signal transmitted from the SerDes unit to the transceiver.

Implementations of this and other methods described in this disclosure can have any one or more of at least the following characteristics.

In some implementations, the SerDes unit is included in an application-specific integrated circuit distinct from the one or more processing chips.

In some implementations, the signal processing operations includes at least one of converting a stream of parallel data to a stream of serial data or converting the stream of serial data to the stream of parallel data.

In some implementations, the port parameters are received at the one or more processing chips from the local platform.

In some implementations, the port parameters include transceiver information that characterizes the transceiver.

In some implementations, the transceiver information includes at least one of a vendor name of a manufacturer of the transceiver, a type of a cable plugged into the transceiver, a length of the cable plugged into the transceiver, an encoding type of signals to be processed using the transceiver, a plug of the network switching unit that corresponds to the transceiver, or a lane speed of the transceiver.

In some implementations, obtaining the SerDes parameters and the transceiver parameter includes identifying, from the local storage, a data structure that corresponds to both an identifier of the network switching unit and a type of a cable plugged into the transceiver.

In some implementations, the data structure includes a comma separated values file.

In some implementations, obtaining the SerDes parameters and the transceiver parameters includes extracting, from the data structure, a subset of the data structure that corresponds to a data transfer speed or a cable length.

In some implementations, configuring the signal processing operations of the SerDes unit includes configuring one or more of a pre-cursor tap weight, a cursor attenuation, a post-cursor tap weight, or a gainshape.

In some implementations, the method includes, prior to obtaining the SerDes parameters and the transceiver parameters, receiving, at the one or more processing chips, from a network operating system of the network switching unit, an initialization command; and in response to receiving the initialization command, performing, by the one or more processing chips, initialization operations.

In some implementations, the initialization operations include causing the local platform to run a thread that detects online insertion and removal events at the network switching unit.

In some implementations, the initialization operations include loading a local database into memory, the memory including the local storage.

In some implementations, the local platform runs on the one or more processing chips.

In some implementations, obtaining the SerDes parameters and the transceiver parameters is performed in response to receiving an indication of a cable insertion event at the port.

In some implementations, the one or more processing chips are included in an application-specific integrated circuit of the network switching unit.

Another aspect of this disclosure describes a network switching unit processing system. The network switching unit processing system includes one or more processors and one or more non-transitory, computer-readable storage media storing instructions that, when executed by the one or more processors, cause the one or more processors to perform operations. The operations include: receiving port parameters corresponding to a port of a network switching unit, where the network switching unit processing system is communicatively coupled to an application-specific integrated circuit that is communicatively coupled to a transceiver communicatively coupled to the port; obtaining, from a local storage, based on the port parameters, (i) serializer/deserializer (SerDes) parameters corresponding to the port, and (ii) transceiver parameters corresponding to the port; configuring signal processing operations of a SerDes unit of the application-specific integrated circuit using the SerDes parameters; and providing, to a local platform of the network switching unit, the transceiver parameters for configuration, using the transceiver parameters, of the transceiver.

Another aspect of this disclosure describes a network switching unit. The network switching unit includes a port; a transceiver communicatively coupled to the port; an application-specific integrated circuit communicatively coupled to the transceiver, the application-specific integrated circuit including a SerDes unit; and a network switching unit processing system. The port, the transceiver, the network switching unit processing system, and the application-specific integrated circuit are together configured to perform operations. The operations include: receiving, at the network switching unit processing system, port parameters corresponding to the port; obtaining, at the network switching unit processing system, from a local storage, based on the port parameters, (i) serializer/deserializer (SerDes) parameters corresponding to the port, and (ii) transceiver parameters corresponding to the port; configuring first signal processing operations of the SerDes unit of the application-specific integrated circuit using the SerDes parameters; configuring second signal processing operations of the transceiver using the transceiver parameters; performing, according to the SerDes parameters, using the SerDes unit, the first signal processing operations on a signal received at the SerDes unit from the transceiver or on a signal transmitted from the SerDes unit to the transceiver; and performing, according to the transceiver parameters, using the transceiver, the second signal processing operations on a signal received at the transceiver from the SerDes unit or on a signal received at the transceiver from an external device.

In some implementations, the first signal processing operations include at least one of converting a stream of parallel data to a stream of serial data or converting the stream of serial data to the stream of parallel data.

In some implementations, the second signal processing operations include at least one of transmitting the signal received at the transceiver from the SerDes unit using a laser of the transceiver, or detecting the signal received at the transceiver from the external device using a photodetector of the transceiver.

Embodiments of the subject matter described in this specification can be implemented to realize one or more of at least the following advantages. SerDes units can be configured for specific signal processing environments, such as cable types and transceiver types, to potentially improve signal processing performance. Transceivers can be configured for specific signal processing environments, such as cable types and externally-coupled devices, to potentially improve signal processing performance. By proper configuration of components, packet drops and other signal transmission errors can be reduced. The SerDes unit and/or transceiver can be configured even when components of the network switching unit can vary across network switching unit implementations. For example, when a given model of application-specific integrated circuit is to be used in multiple types of network switching unit or when the application-specific integrated circuit and other components of the network switching unit are provided by separate suppliers, applicable configuration settings can be applied to the SerDes unit and/or transceiver, potentially improving device interoperability. Configuration parameters can be updated on-the-fly through re-scanning operations without requiring operating system re-installations or restarts. Configuration parameter access speed can be increased by loading of configuration files into memory.

The details of one or more implementations are set forth in the accompanying drawings and the description below. Other aspects, features and advantages will be apparent from the description and drawings, and from the claims.

DETAILED DESCRIPTION

Network switching units (NSUs), in the form of switches, bridges, routers, and other intermediary data reception/transmission devices, can be used on small and large scales to guide network processes. Scaling of these devices in signal speed, port count, and other parameters has enabled implementation of the enormous datacenters that underpin today's cloud-based systems.

While some suppliers manufacture and provide entire NSUs including proprietary software, more typically an NSU includes discrete modules and systems from multiple sources that must communicate with one another to provide overall network switching functionality. In some circumstances, an original design manufacturer (ODM) produces the body of the NSU, including ports, a circuit board including interconnections, and, in some implementations, a network switching unit processing system. Primary network switching functionality is provided by an application-specific integrated circuit/processing chip (ASIC) supplied by a second manufacturer; the ASIC and the NSU body are compatibly designed so that the interconnections of the NSU couple to appropriate pins of the ASIC. Transceivers can be provided by the ODM of the NSU (e.g., in a proprietary format with vendor "lock-in") or can be provided by a third party supplier. An internal processing system (e.g., one or more processors, in some implementations including memory and/or storage) of the NSU runs a network operating system (NOS) that is not directly managed or overseen by the ODM or by the ASIC manufacturer, such as the open-source SONIC or Cumulus Linux NOSs. The NOS must be loaded with drivers that are specifically compatible with the particular ASIC and ports of the NSU. Ensuring interoperability between modules associated with three separate entities—the ODM and/or transceiver supplier, the ASIC supplier, and the NOS manager—is a difficult task, not least because modern NOSs are tasked with reliably routing ultrafast signals that may have speeds of 112 Gbit/second or higher. Additional variables only complicate the challenge. For example, different types of cables plugged into a given port will necessitate different processing of signals received at or transmitted from the port.

This application describes systems and methods for managing NSU configuration in the context of these interoperability and configuration challenges. An NOS is provided with a configuration library that is able to identify port-specific and cable-specific parameters from a local storage on-the-fly and configure both ASIC functions and transceiver operations accordingly.

Figure 1:
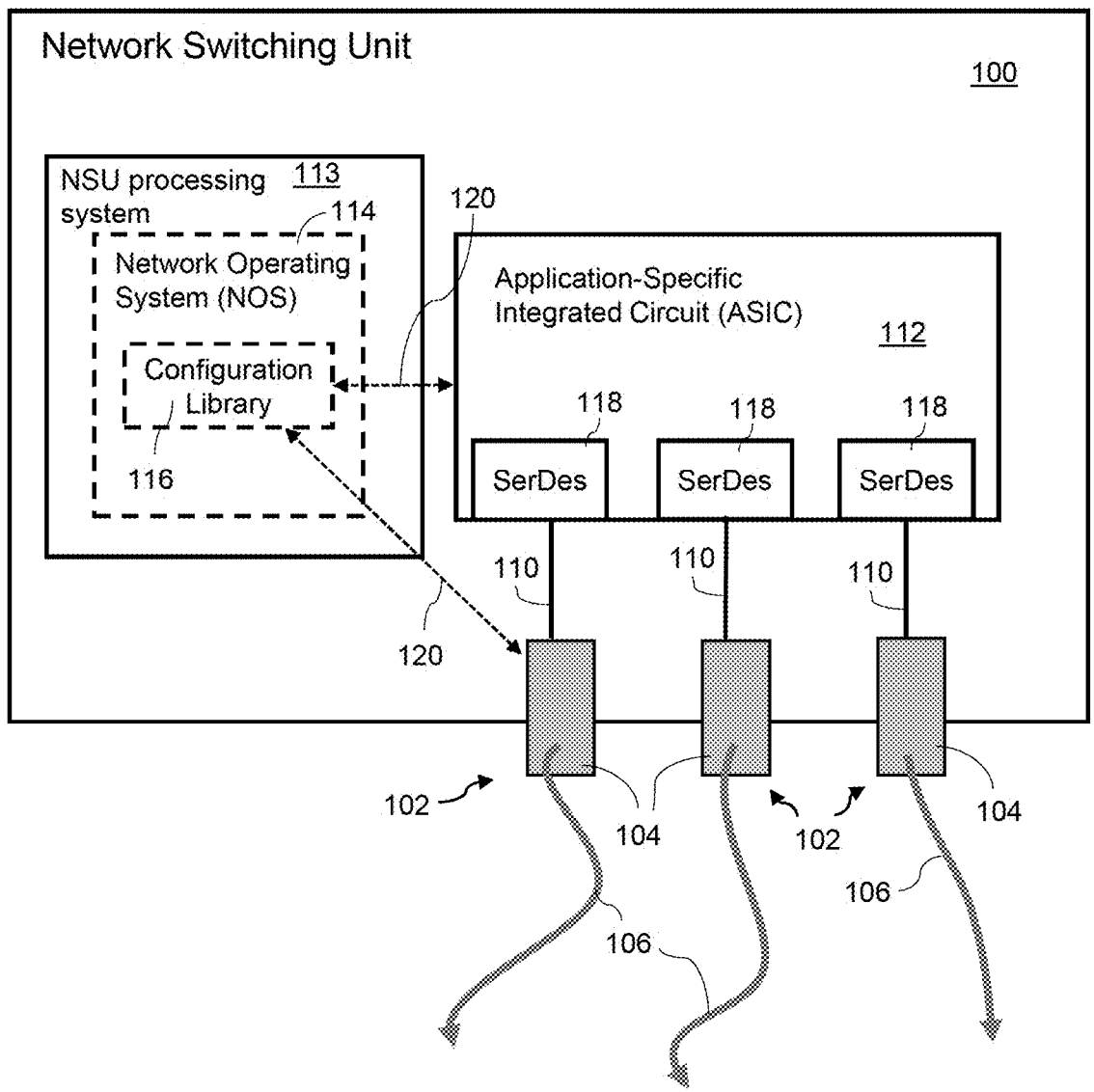
FIG. 1 is a diagram of an example network switching unit.

FIG. 1 shows an example a network switching unit 100. Multiple ports 102 are integrated into a front panel of the network switching unit 100, each port 102 configured to receive a transceiver 104 that is coupled to a cable 106 (e.g., a coaxial cable, a Twinaxial cable, or a fiber optic cable). The transceiver 104 provides low-level signal transmission/reception functionality. For example, in a small form-factor pluggable (SFP) transceiver, a laser diode converts electrical signals to optical signals for transmission, and a photodetector diode converts incoming optical signals to light for signal reception. The operations of control circuits of the transceivers 104 (e.g., circuits that control timings, intensities, detection thresholds, and other parameters of the laser diode and photodetector diode) can depend on, among other possible factors, lengths of interconnections 110, types and lengths of the cables 106, parameters of an ASIC 112 that processes incoming and outgoing signals (e.g., a model and/or operating system of the ASIC), signal protocols, and/or a type of device on the other end of the cable.

The interconnections 110 couple the ports 102 to the ASIC 112. For example, the ports 102 may be mounted on a printed circuit board (PCB) on which the ASIC 112 is also mounted, and the interconnections 110 may be metallic traces in or on the PCB. The interconnections 110 may instead, or additionally, include other coupling elements, such as swappable cables. In some implementations, one or more other components interact with signals between the ports 102 and the ASIC 112, such as a retimer and/or an amplifier.

The example NSU 100 of FIG. 1, besides the ASIC 112, includes an NSU processing system 113, e.g., one or more computer chips (such as one or more processors, memory devices, and/or storage devices) distinct from the ASIC 112. In some implementations, the NSU processing system 113 or the functionality thereof (as described in this disclosure) is built into or otherwise combined with the ASIC 112. For example, in some implementations a unified computing unit performs both ASIC signal processing functions and the operations described in this disclosure for the NSU processing system 113 and NOS 114.

The NSU processing system 113 runs an NOS 114 such as SONIC. As described in more detail below, a configuration library 116 of the NOS 114 interacts with one or more serializer/deserializer (SerDes) units 118 of the ASIC 112 and with other components of the NSU 100, such as the transceivers 104. For example, the configuration library 116 determines appropriate configuration settings for the SerDes unit 118 and the transceivers 104, and configures the SerDes units 118 and the transceivers 104 according to the configuration settings. One or more couplings 120 (e.g., metal traces, wires, cables, and/or optical cables) can be used for communication (e.g., one-way and/or both-ways transmissions of electrical and/or optical signals) between the NSU processing system 113, the AISC 112, and the transceivers 104, to facilitate transmission of information therebetween.

The SerDes units 118 are hardware and/or software components that convert data between serial and parallel formats. For example, a stream of parallel data may be converted, by a SerDes unit 118, into a serial (one bit) stream that is transmitted out of the NSU 100 through one of the ports 102. In the other direction, a serial stream received at the NSU 100 at one of the ports 102 is provided to the ASIC 112 over an interconnection 110 and converted into a parallel data stream by the SerDes unit 118. However, the precise data processing and signal processing operations carried out by the SerDes unit 118 depend on, among other possible factors, signal types, signal sources, and/or signal recipients of outgoing and incoming signals. In particular examples, the processing operations can depend on transceiver models, cable types, cable lengths, lane counts, lane speeds, and/or signal encodings. In some implementations, a SerDes unit 118 handles signal processing for multiple ports 102. In some implementations, each port 102 is coupled to a corresponding SerDes unit 118 that handles signal processing for that port 102.

Figure 2:
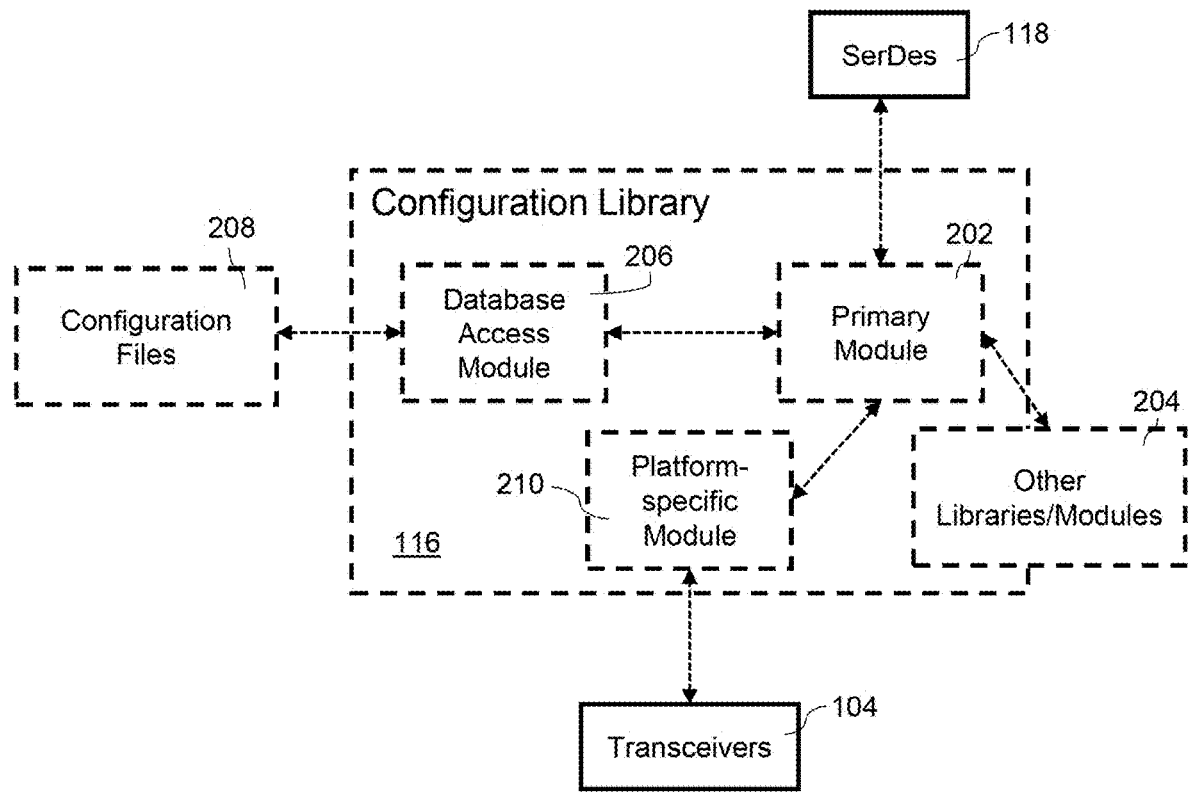
FIG. 2 is a diagram of an example configuration library.

In some implementations, as shown in FIG. 2, the configuration library 116 includes several modules that interact to perform configuration operations. A primary module 202 performs both internal and SerDes-interfacing operations, including interfacing with the SerDes units 118 and with other libraries/modules 204 of the NOS 114 and NSU processing system 113, including libraries/modules that are included in the configuration library 116 and/or external to the configuration library 116, such as APIs used to interface with the configuration library 116. A database access module 206 identifies and parses configuration files 208 that contain configuration parameters, as described in more detail below. A platform-specific module 210 is configured to interface with other hardware components of the NSU 100 or coupled to the NSU 100, such as the transceivers 104.

In some implementations, the primary module 202 and database access module 206 are proprietary to the supplier of the ASIC 112 or otherwise specifically configured for the ASIC 112, such that the primary module 202 is natively configured to configure the SerDes units 118 of the ASIC 112. For example, the primary module 202 is configured based on a model of the SerDes unit 118 and a pin configuration of the ASIC 112 so that, given port and cable information, the primary module 202 can configure the SerDes units 118 accordingly. However, because in some implementations, as previously described, the configuration library 116 is provided by a different entity than other components such as the transceivers 104, the primary module 202 may not be natively configured to communicate with and/or reconfigure the other components such as the transceiver 104, and, further, it may be preferable to have the primary module 202 be substantially uniform across different NSUs, port arrangements, etc.

Therefore, in some implementations, the platform-specific module 210 is included in the configuration library 116 as a platform-compatible intermediary between the primary module 202 and the platform or other components of the NSU 100, such as the transceivers 104. For example, when a cable is plugged into the NSU 100, the platform-specific module 210 detects the plug-in event and communicates information about the plug-in event to the primary module 202. The primary module 202 determines transceiver parameters appropriate for the plug-in event (e.g., for the cable) and transfers the transceiver parameters to the platform-specific module 210, which configures the transceivers 104 accordingly. The platform-specific module 210 may be created and configured through collaboration between the ODM and a provider of the configuration library 116.

The number and arrangement of modules provided here are examples that represent certain possible implementations. In other implementations, functionalities described herein as being performed by one module could be split across multiple modules, and/or functionalities described as performed by separate modules could be combined into a single module. Moreover, the partition of the configuration library 116 into separate modules may not be present in other implementations.

Figure 3:
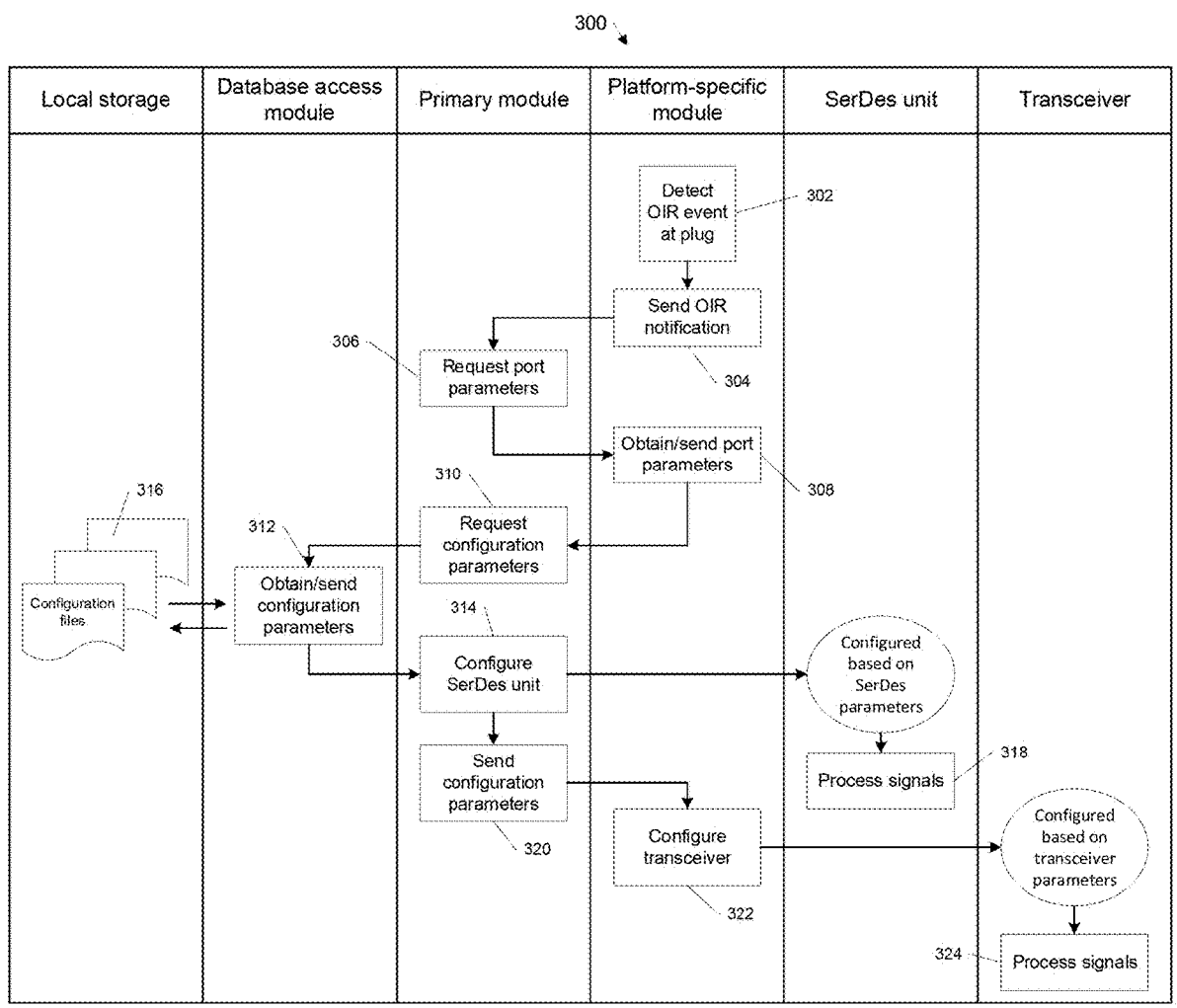
FIG. 3 is a diagram of an example configuration process.

FIG. 3 shows an example process 300 for configuration of the transceivers 104 and the SerDes units 118 using a configuration library such as configuration library 116 running on NSU processing system 113 or another computing component. The process 300 may be triggered by detection of online insertion and removal (OIR) event at a port of the NSU (302), or by another trigger, such as an explicit user-initiated or automatic command (e.g., a command received at the configuration library via an API of the configuration library). Examples of OIR events include a user plugging a cable into a port, a device being plugged into a cable plugged into a port, a device that is plugged into a cable plugged into a port being enabled, or merely the presence or lack thereof of a cable plugged into a port. In some implementations, the OIR events are detected by a thread of the platform-specific module that is initialized based on an instruction from the primary module.

In response to detection of the OIR event, the platform-specific module sends an OIR notification to the primary module (304). In response to receiving the OIR notification, the primary module requests port parameters from the platform-specific module (306). As noted previously, the ports and the primary module may not be able to natively communicate with one another. The platform-specific module can act an intermediary to translate, for example, requests from the primary module to queries understandable by the transceiver, and to translate port parameters into a format parsable by the primary module.

In response to the port parameter request, the platform-specific module obtains port parameters and provides them to the primary module (308). For example, in some implementations, the platform-specific module accesses an electrically erasable programmable read-only memory (EEPROM), or other storage, of the transceiver (e.g., using a platform-specific driver in the NOS that is configured to access EEPROMs or other storages of transceivers inserted into ports of the NSU) and reads the port parameters from the EEPROM or other storage. In some implementations, at least some of the port parameters (e.g., speed and/or lane count) are obtained from the NOS. Examples of port parameters can include one or more of at least the following: a transceiver model of a port corresponding to the OIR event; a cable type of a cable plugged into the port; a length of the cable; a lane count of the port; a lane speed of the port; a type of external device on the other end of the cable; or a signal encoding corresponding to the port, cable, and/or external device on the other end of the cable. "Port parameters" therefore includes, in some implementations, at least some parameters that describe a transceiver, cable, or other component plugged into or otherwise coupled to a port, instead of or in addition to parameters of only a port itself.

The primary module then requests that the database access module provide configuration parameters as a function of the port parameters (310). To obtain the configuration parameters (312), the database access module accesses a local storage device storing one or more configuration files 316. The local storage may be, for example, a storage device or memory device of the NSU processing system 113. Further details on the configuration files 316 and their storage are provided below.

The database access module transfers the configuration parameters to the primary module (312), in some implementations performing a format conversion to match a format in which the primary module expects to receive the configuration parameters. The primary module then uses SerDes configuration parameters included in the configuration parameters to configure one or more SerDes units (314) (e.g., by transmitting corresponding data/instructions to the ASIC over the couplings 120). The SerDes configuration parameters dictate how the SerDes units will process (318) signals transferred to the port by the ASIC and/or signals received at the ASIC from the port, "the port" here being the port characterized by the port parameters based on which the configuration parameters were identified.

In some implementations, to interface with the one or more SerDes units being configured, the primary module returns SerDes configuration parameters to another application/module of the NOS and causes the other application/module to call an API of the ASIC to configure hardware of the one or more SerDes units. For example, the other application/module, in response to an instruction of the primary module, causes a set of registers within the ASIC to be written to, the set of registers corresponding to a block of memory in the ASIC that is reserved for the SerDes units. In some implementations, the primary module itself calls the API of the ASIC to configure the hardware of the one or more SerDes units.

Examples of SerDes configuration parameters can include one or more of at least the following: a pre-cursor tap weight; a cursor attenuation; a post-cursor tap weight; gain-related parameters such as gainshape; clock/timing attributes; and/or filtering attributes. Other SerDes configuration parameters are also within the scope of this disclosure.

In some implementations, the primary module also provides transceiver configuration parameters included in the configuration parameters to the platform specific module (320). In this example, the primary module is not natively configured to interface with the transceiver. However, the platform-specific module is configured to interface with the transceiver and, accordingly, can configure the transceiver based on the transceiver configuration parameters (322) (e.g., by transmitting corresponding data/instructions to the transceiver over the couplings 120). The transceiver configuration parameters dictate how the transceiver will process (324) signals transmitted from NSU to other devices through the port and/or signals received at the NSU from other devices at the port.

Examples of transceiver configuration parameters can include timings at which a laser diode of the transceiver will send signals and/or at which a photodetector diode of the transceiver will detect signals; intensities of transmitted signals, detection thresholds for signals received at the transceiver; power mode; enabling operations such as optics, CTLE, or a laser; electrical TxFIR emphasis parameters; electrical TxFIR amplitude parameters; and/or latched Tx parameters.

Because the SerDes configuration parameters and transceiver configuration parameters are identified for the specific combination of port/transceiver/cable/other connecting device present in the signal path (e.g., based on the port parameters), the SerDes configuration parameters and transceiver parameters are more optimized for associated signal processing. The parameter optimization can lead to reduced packet drops, reduction/elimination of errors such as cyclic redundancy check (CRC) errors and temperature/voltage volatility-induced errors, and reduced occurrence of link failure.

Besides these potential improvements in signal processing effectiveness, configuration processes such as the example process 300 are particularly useful at providing flexibility and adaptability in the context of ASICs of NSUs. As noted above, in modern NSUs, interoperability between components can be a challenge because the components are supplied by separate entities. The processes described in this disclosure can overcome this challenge by allowing identification (e.g., through an OS library installed in an NSU) to identify applicable configuration parameters and apply them to both a SerDes unit and a transceiver of the NSU. Even in situations where NSU components are more vertically integrated (e.g., supplied by a single entity), the described processes can enable increased interoperability of ASICs and NOSs across different NSU designs, configurations, and implementations. Moreover, the described processes allow for NSU components to be configured based on cable types and other parameters that are applicable at any given moment, instead of relying on hard-coded parameters that may not be well-suited for every combination of cable type, cable length, signal speed, and other port parameters.

Configuration processes can vary depending on the implementation. For example, in some implementations, the primary module interacts directly with and directly configures the transceiver without employing a platform-specific module, including, in some implementations, obtaining the port parameters from the transceiver without a platform-specific module. In some implementations, only one of the SerDes unit and the transceiver is configured based on the configuration parameters. In some implementations, the configuration parameters include additional configuration parameters that are used to configure other components of the NSU.

Figure 4:
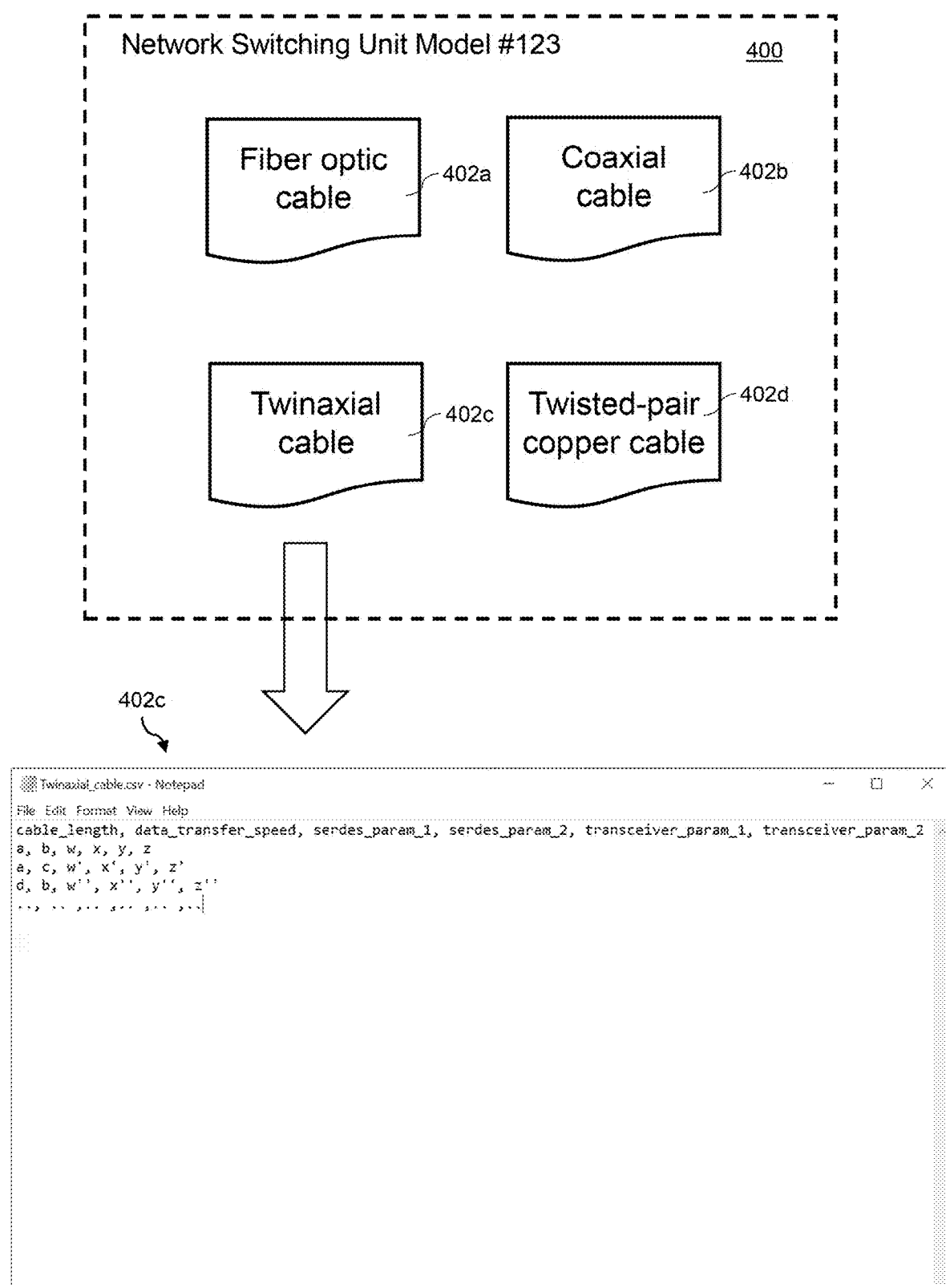
FIG. 4 is a diagram of example configuration data.

Referring back to process 312, the one or more configuration files 316 may have one or more of a variety of formats depending on the implementation. An example of a configuration file storage format is shown in FIG. 4. An overarching directory 400 (for example, a database, a folder, or an archive) holds multiple configuration files 402a, 402b, 402c, 402d. The directory 400 corresponds to a model of the NSU, such that the configuration files 402 within the directory 400 contain configuration parameters specific to the model of the NSU, e.g., specific to a number of ports, arrangement of ports, and types of ports (e.g., transceiver model(s)) of the NSU. In some implementations, multiple directories 400 are stored in the local storage, each directory 400 corresponding to a different NSU model. When the database access module retrieves configuration parameters, the database access module identifies the directory 400 matching the current NSU model.

Each configuration file 402 corresponds to a different cable type, such as fiber optic cable, coaxial cable, Twinaxial cable, or twisted-pair copper cable. The database access module identifies the relevant configuration file 402 based on the port parameters provided by the platform-specific module to the primary module. For example, based on which port corresponds to the OIR event, the platform-specific module can identify a corresponding cable type that is compatible with the port and include the cable type in the port parameters. The database access module then opens the configuration file 402 corresponding to that cable type.

In this example, each configuration file 402 is a comma separate values (CSV) file. Configuration file 402c ("Twinaxial_cable.csv") includes comma-separated columns correspond to both port parameters and configuration parameters. Specifically, "cable_length" and "data_transfer_speed" are port parameters that describe a length of a cable plugged into a Twinaxial port and a speed at which data is to be transferred into and/or out of the Twinaxial port; "serdes_param_1" and "serdes_param_2" are different types of SerDes configuration parameters, e.g., parameters according to which the SerDes unit is to be configured; and "transceiver_param_1" and "transceiver_param_2" are different types of transceiver configuration parameters, e.g., parameters according to which a transceiver of the Twinaxial port is to be configured. Each set of port parameters (e.g., {a,b} or {a,c}) corresponds to a corresponding set of configuration parameters (e.g., {w, x, y, z} or {w', x', y', z'}). The database access module selects, from the configuration file 402c, a row having port parameters that match the port parameters provided by the primary module, and then obtains the configuration parameters of that row. Note that the letters in FIG. 4 represent parameter values that may, in practice, be strings, integers, floats, and/or other types, including physical parameters like lengths, frequencies, voltages, and other measurable quantities. Moreover, other data structures may be used besides CSV files for storing port parameters in association with configuration parameters, such as a relational database management system (e.g., a database managed using SQL), JSON-formatted files, or other database/ data structure types.

Figure 5:
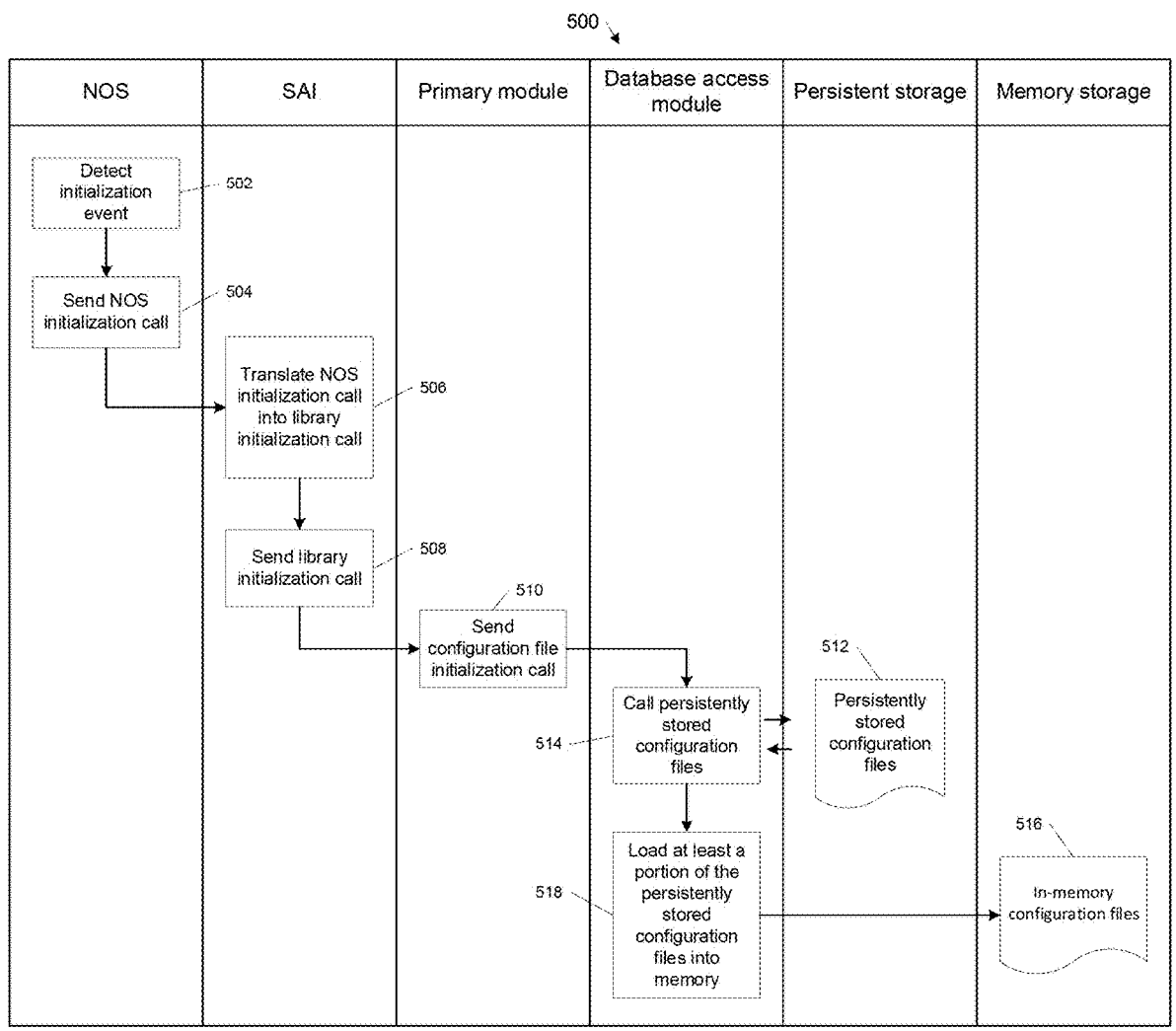
FIG. 5 is a diagram of an example initialization process.

In some implementations, the configuration files 316, as accessed by the database access module to retrieve configuration parameters, are an in-memory database. FIG. 5 shows an example initialization process 500 for loading the configuration files 316 into memory. In this example, the initialization process 500 involves the NOS as distinct from the configuration library, e.g., portions of the installed NOS that are outside the configuration library. The initialization process 500 also involves a switch abstraction interface (SAI), which is an API of the configuration library that is configured to translate NOS calls into configuration library calls. Note that alternative calling procedures and calling structures can instead or additionally be used.

The NOS detects an initialization event (502). The initialization event may be, for example, a power-on event of the NSU that triggers power-on initialization operations for various components of the NSU, including for the configuration library. Other types of initialization events can include restart events (e.g., reloading the configuration library or rebooting the NOS), upgrade events (e.g., loading a new version of the NOS, which may include new configuration files), and/or rescan events (e.g., installing updated configuration files into the persistent storage and then scanning the updated files, or scanning already-updated files). In general, the process 500 may be performed whenever it may be advantageous to check for and/or load updated configuration files.

In response to the initialization event, the NOS sends an initialization call to the SAI (504). The SAI translates the initialization call from the call's NOS format to a configuration library format that is understandable/parsable by the configuration library (506), and then sends the translated initialization call to the primary module of the configuration library (508). The primary module forwards the initialization call to the database access module of the configuration library (510).

Upon receiving the initialization call, the database access module calls a database 512 of persistently stored configuration files from a persistent storage of the NSU processing system (514). The persistent storage may be, for example, a flash storage (solid state storage) or a persistent memory storage integrated into the NSU processing system. The database may include configuration files corresponding to many different NSU models (e.g., all NSU models with which the configuration library is configured to interface), or the database may include only configuration files that are relevant to the particular NSU on which the configuration library is installed.

The database access module loads at least a portion of the database 512 of persistently stored configuration files into a local memory (e.g., RAM) of the NSU processing system, as an in-memory database 516 of configuration files (518). For example, the database access module may identify a subset of configuration files that apply to the particular NSU on which the configuration library is installed (e.g., the directory 400), and load only those configuration files into memory. Or, the database access module may load all the persistently stored configuration files into memory, with the database access module tasked later (e.g., during process 312) with identifying the configuration files that currently apply.

A storage format of the database 512 of persistently stored configuration files need not be (though may be) the same as a storage format of the database 516 of in-memory configuration files. For example, in some implementations, the data structure shown in FIG. 4 (including, e.g., separate CSV files) corresponds to a storage format of the database 512 of persistently stored configuration files, but the database access module parses the database 512 and converts the data into another data format (e.g., a relational database, a single CSV file, or another format) for storage as the database 516 of in-memory configuration files. The database 516, in the other data format, is subsequently accessed for SerDes and transceiver configuration.

Pre-loading of the database 516 into memory can, in some implementations, allow for more rapid access to and reading of the database 516, because memory access operations tend to be faster than access operations in persistent storage.

Figure 6:
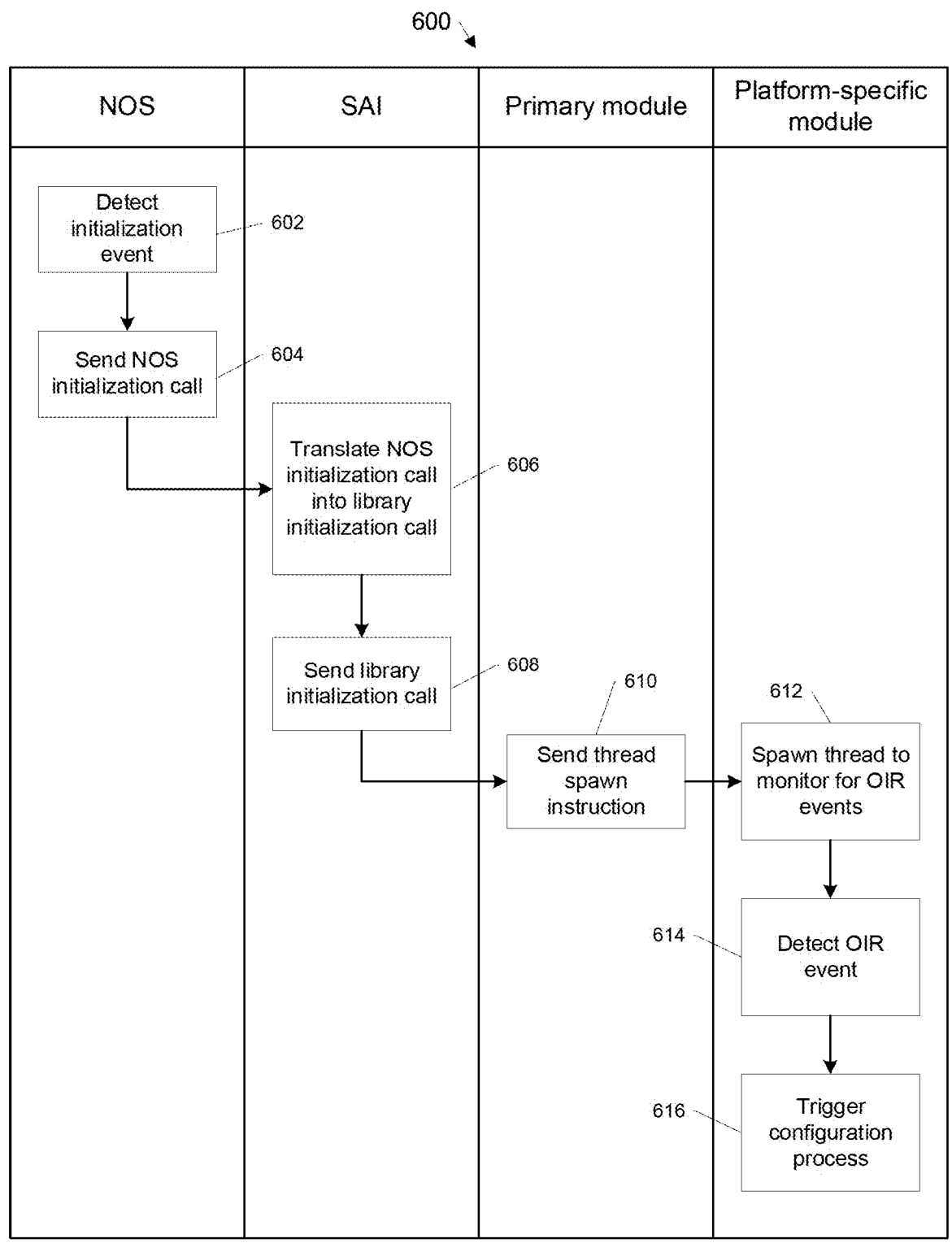
FIG. 6 is a diagram of an example initialization process.

FIG. 6 shows another example of an initialization process 600 that may, in some implementations, be partly or wholly combined with the initialization process 500 and/or with other initialization processes. Processes 602, 604, 606, 608 may be performed as described for the corresponding processes 502, 504, 506, 508 of FIG. 5. After receiving an initialization call, the primary module sends a thread spawn instruction to the platform-specific module (610). In response, the platform-specific module spawns a thread of the platform-specific module that monitors for OIR events at one or more ports of the NSU (612). For example, if the initialization event is a power-on event, the thread may scan through each port of the NSU to check its current connection state. The thread may then continue to run to monitor for future OIR events such as cable insertions and removals. When an OIR event is detected (614), the platform-specific module triggers a configuration process to configure a SerDes unit and/or transceiver based on specifics of the OIR event (616), e.g., triggers the process 300 described in reference to FIG. 3.

Figure 7:
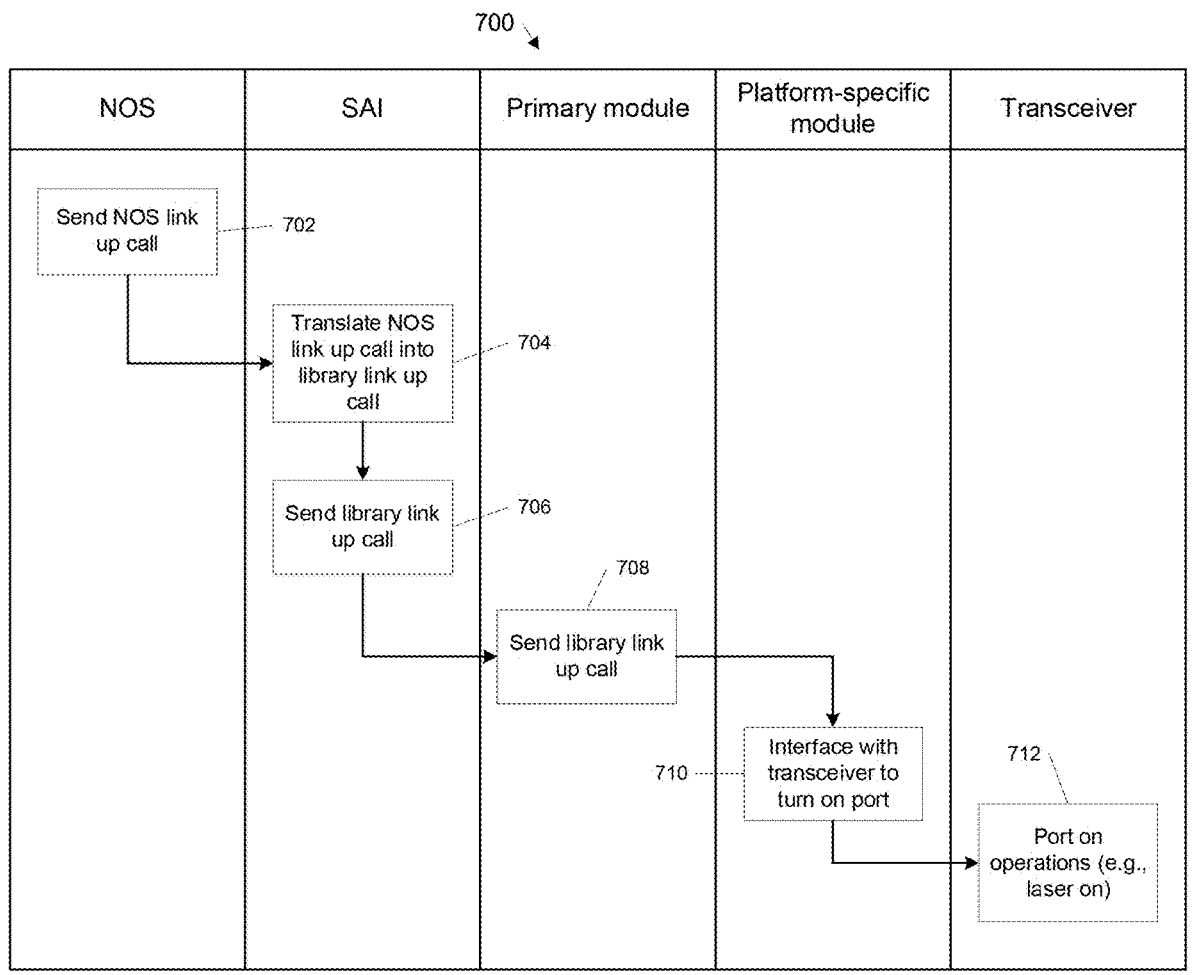
FIG. 7 is a diagram of an example link up process.

FIG. 7 shows an example of how an NOS library can interact with NSU transceivers outside the specific context of transceiver parameter configuration. In this case, the example process 700 is a link up process in which a port of the NSU is enabled. The NOS (as distinct from the configuration library) provides a link up call to a SAI (702), e.g., in response to receiving a notification from the ASIC. For example, the link up call may specify that a particular port number is to be enabled. The SAI reformats the link up call into a format that the configuration library understands (704) and sends the reformatted link up call to the primary module (706). The primary module passes the link up call to the platform-specific module (708), in some implementations performing additional reformatting/translation of the link up call. The platform-specific module is configured to interface with transceivers of the NSU and, therefore, can provide an appropriate command or signal to the transceiver of the specified port to turn on the port (710). The port performs corresponding turn on operations (712), such as turning on a laser of the transceiver of the port. The port is now "up" and may be used to transmit and receive signals. Analogous operations can be used to turn off the port.

The inter-component and inter-module calls and communications described in this disclosure (e.g., in FIGS. 3 and 5-7) can be implemented in various formats and by various combinations of functions. The following descriptions are non-limiting examples of function calls that illustrate the underlying processes.

parameters_get is a function called by the database access module to query the configuration files and obtain configuration parameters. As input parameters, parameters_get takes a list input_attr of port attributes (transceiver-vendor-type, cable-type, lane-speed, encoding, and front-port) and a count input_count of the port attributes. parameters_get provides, as output, a list out_attr of configuration parameters as described throughout this disclosure.

database_init is a function called by the database access module to parse configuration files stored in a persistent storage (e.g., CSV files found in a params_directory path) and keep configuration parameters of the configuration files in memory. As input, database_init takes params_directory.

database_deinit is a function called by the database access module to remove a configuration parameter database current stored in memory. This function may be called, for example, when an initialization event indicates that the configuration parameters should be reloaded, such as if the configuration files stored in the persistent storage have been updated with improved values.

transceiver_info_get is a function called by the platform-specific module (or by the primary module for parsing and execution by the platform-specific module) to obtain port parameters to be used for determining configuration parameters. When called, the function causes interfacing operations with a transceiver of a port. As input parameters, transceiver_info_get takes intf_name (an identifier of the port for which port parameters are to be obtained), a key list attr_list_p of types of port parameters to be obtained, and a count attr_count of the port parameters. As output, transceiver_info_get provides a value list attr_list_p of values of port parameters corresponding to the types of port parameters indicated in the key list attr_list_p input.

transceiver_config is a function called by the platform-specific module (or by the primary module for parsing and executed by the platform-specific module) to configure a transceiver. As input, transceiver_config takes an identifier intf_name of a port corresponding to the transceiver (e.g., "Ethernet0"), a list attr_list_p of transceiver configuration parameters according to which the transceiver is to be configured, and a count attr_count of the transceiver configuration parameters. transceiver_config may return an indication of configuration success (0) or failure (1).

serdes_config is a function called by the primary module to configure the SerDes unit of the ASIC. As input, serdes_config takes an identifier intf_name of a port with which the SerDes unit is to be configured to interact (e.g., "Ethernet0"), a list attr_list_p of SerDes configuration parameters according to which the SerDes unit is to be configured, and a count attr_count of the SerDes configuration parameters. serdes_config may return an indication of configuration success (0) or failure (1).

port_link_up is a function called by the platform-specific module (or by the primary module for parsing and execution by the platform-specific module) to enable a port. For example, when executed, port_link_up may cause a laser of the port to be turned on. port_link_up takes, as input, an identifier intf_name of the port (e.g., "Ethernet0"). port_link_up may return an indication of turn-on success (0) or failure (1). port_link_down is an analogous function to disable the port.

Storing the configuration files in a persistent storage—and, in some implementations, outside the configuration library itself—can provide advantages for NSU operation and flexibility. If the configuration files are hard-coded into a particular build of the configuration library on the NOS, then updating the configuration files—for example, changing SerDes or transceiver parameters, or adding new SerDes or transceiver parameters—can involve changing the entire NOS image, e.g., flashing the NOS installation on the NSU processing system. This can be disruptive to NSU operations, including, for example, disrupting data traffic flowing through all ports on the device, even if the change in configuration parameters is relevant to only a subset of the ports. By contrast, the use of functions like database_init that are called by the configuration library but that query an external persistent storage can allow for timely rescanning of persistently stored configuration files without disrupting other NSU/ASIC operations. This rescanning can be referred to as "on-the-fly" because it can be performed at-will (e.g., by calling the database_init function) with less or no disruption to NSU/ASIC operations than if more inflexible data storage/access arrangements were used.

Figure 8:
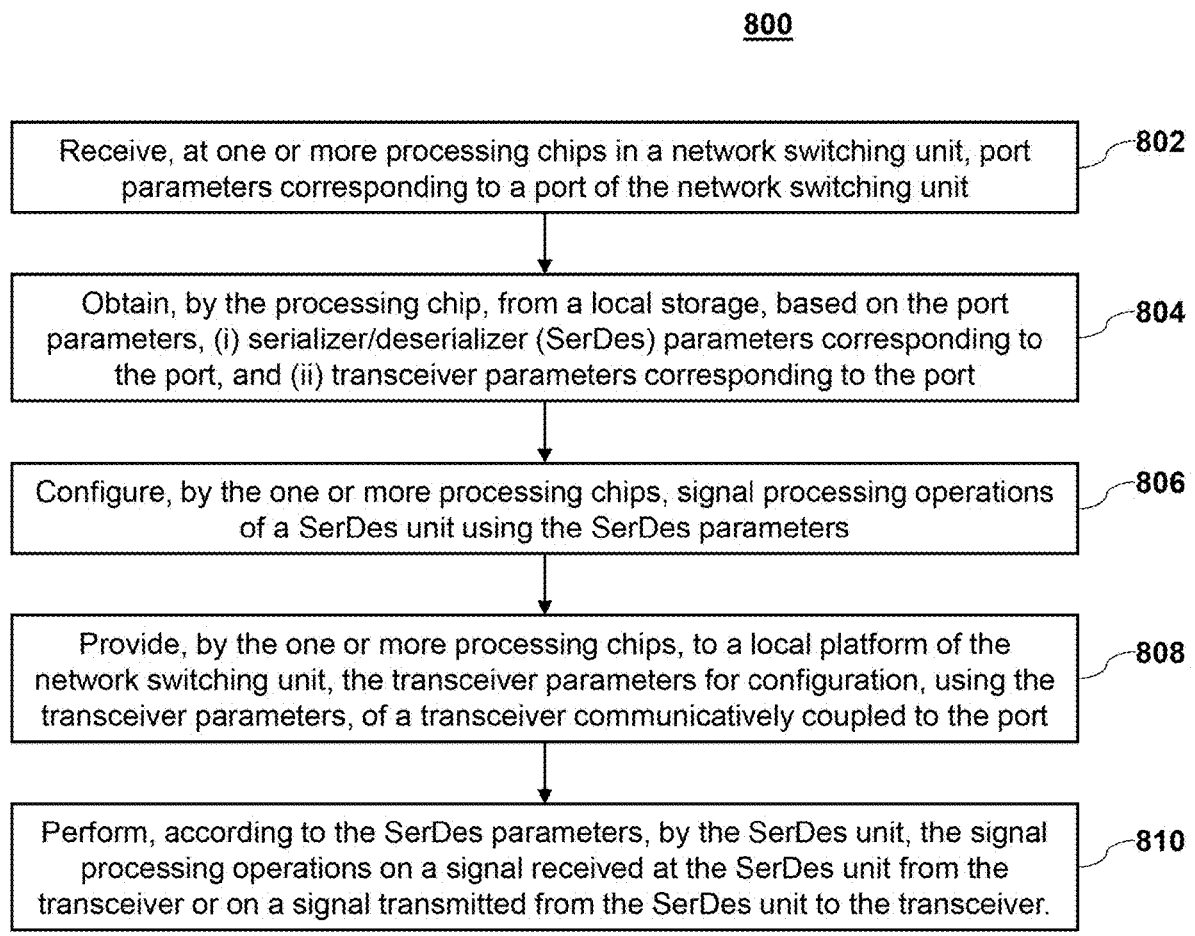
FIG. 8 is a diagram of an example configuration process.

FIG. 8 shows an example configuration process 800 according to some implementations of this disclosure. In some implementations, the configuration process 800 is performed by an NSU processing system (e.g., NSU processing system 113) and/or by an ASIC (e.g., ASIC 112). In some implementations, the configuration process 800 is performed partially or wholly by a configuration library (e.g., configuration library 116) installed on an NSU, such as by a primary module (e.g., primary module 202) of the configuration library. In some implementations, a primary module as described throughout this disclosure performs the process 800. In the process 800, port parameters corresponding to a port of a network switching unit are received at one or more processing chips in the network switching unit (802). Both (i) serializer/deserializer (SerDes) parameters corresponding to the port, and (ii) transceiver parameters corresponding to the port, are obtained from a local storage based on the port parameters (804). Signal processing operations of a SerDes unit are configured using the SerDes parameters (806). The transceiver parameters are provided to a local platform of the network switching unit, for configuration, using the transceiver parameters, of a transceiver communicatively coupled to the port (808). The signal processing operations are performed by the SerDes unit, according to the SerDes parameters, on a signal received at the SerDes unit from the transceiver or on a signal transmitted from the SerDes unit to the transceiver (810).

Therefore, based on the processes and systems described in this disclosure, improved network switching unit performance can be achieved by improved (re) configurability and signal processing performance.

"Network switching units," as described in this disclosure, include at least a wide variety of network-associated devices, including routers, servers, hubs, bridges, gateways, switches, repeaters, and any other computing device that processes high-speed signals. Network switching units can be categorized according to rack-unit sizes (e.g., one rack-unit, two rack-unit, four rack-unit, or another size) based on a size of the network switching unit, a number of connectors on the front of the network switching unit, and other factors. Network switching units according to this disclosure can be of any rack-unit size or any other appropriate height.

The processes and methods described herein (hereinafter referred to as "the processes"), including database query, query, updating, and storage processes, along with configuration and interfacing processes (e.g., SerDes unit and transceiver interfacing and configuration) and signal processing processes (e.g., serializing/deserializing operations by the SerDes unit and signal transmission/detection operations by the transceiver) can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit). The ASIC and NSU processing system described herein may each include one or multiple integrated circuits, chips, and/or other hardware computing units coupled to one another in an NSU, including some or all of the components of a computer described below and/or the associated components described below, such as storage, memory, and interfacing features. Modules of the ASIC and NSU processing system may be implemented in hardware and/or in software. For example, the SerDes unit may be wholly or partially a distinct hardware component of the ASIC that is specially configured for fast SerDes operations. Moreover, in some implementations the ASIC is a general-purpose computing component that need not be (but may be) "application-specific" in its hardware. In some implementations, the ASIC and NSU processing system are integrated together with one another, e.g., as a unified computing device.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Processors or computer systems "configured" to perform one or more of the processes, algorithms, functions, and/or steps disclosed herein include one or more general or special purpose processors as described herein as well as one or more computer and/or machine-readable storage devices on which computer programs for performing the processes are stored.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

Components may be coupled (e.g., communicably coupled) over one or more networks or physically within a device. Coupling may include the capability to transmit data, including instructions, back and forth between the components, such as by traces, cables (electrical and/or optical), wires, and/or other interconnections.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet. Communication networks can be used to load data onto the system, such as updates to configuration files or the configuration library.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

A number of implementations have been described. Nevertheless, it will be understood that various modifications may be made without departing from the spirit and scope of this disclosure. For example, features described above in connection with different embodiments may be combined in the same implementation. Further, some features described above may be omitted in some implementations. Accordingly, other implementations are within the scope of the claims.

What is claimed is:

1. A computer-implemented method comprising:
   receiving, at one or more processing chips in a network switching unit, port parameters corresponding to a port of the network switching unit;
   obtaining, by the one or more processing chips, from a local storage, based on the port parameters, (i) serializer/deserializer (SerDes) parameters corresponding to the port, and (ii) transceiver parameters corresponding to the port;
   configuring, by the one or more processing chips, signal processing operations of a SerDes unit using the SerDes parameters;
   providing, by the one or more processing chips, to a local platform of the network switching unit, the transceiver parameters for configuration, using the transceiver parameters, of a transceiver communicatively coupled to the port; and
   performing, according to the SerDes parameters, by the SerDes unit, the signal processing operations on a signal received at the SerDes unit from the transceiver or on a signal transmitted from the SerDes unit to the transceiver.

2. The computer-implemented method of claim 1, wherein the SerDes unit is included in an application-specific integrated circuit distinct from the one or more processing chips.

3. The computer-implemented method of claim 1, wherein the signal processing operations comprise at least one of converting a stream of parallel data to a stream of serial data or converting the stream of serial data to the stream of parallel data.

4. The computer-implemented method of claim 1, wherein the port parameters are received at the one or more processing chips from the local platform.

5. The computer-implemented method of claim 1, wherein the port parameters comprise transceiver information that characterizes the transceiver.

6. The computer-implemented method of claim 5, wherein the transceiver information comprises at least one of a vendor name of a manufacturer of the transceiver, a type of a cable plugged into the transceiver, a length of the cable plugged into the transceiver, an encoding type of signals to be processed using the transceiver, a plug of the network switching unit that corresponds to the transceiver, or a lane speed of the transceiver.

7. The computer-implemented method of claim 1, wherein obtaining the SerDes parameters and the transceiver parameters comprises:
   identifying, from the local storage, a data structure that corresponds to both an identifier of the network switching unit and a type of a cable plugged into the transceiver.

8. The computer-implemented method of claim 7, wherein the data structure comprises a comma separated values file.

9. The computer-implemented method of claim 7, wherein obtaining the SerDes parameters and the transceiver parameters comprises:
   extracting, from the data structure, a subset of the data structure that corresponds to a data transfer speed or a cable length.

10. The computer-implemented method of claim 1, wherein configuring the signal processing operations of the SerDes unit comprises configuring one or more of a precursor tap weight, a cursor attenuation, a post-cursor tap weight, or a gainshape.

11. The computer-implemented method of claim 1, comprising, prior to obtaining the SerDes parameters and the transceiver parameters:
   receiving, at the one or more processing chips, from a network operating system of the network switching unit, an initialization command; and
   in response to receiving the initialization command, performing, by the one or more processing chips, initialization operations.

12. The computer-implemented method of claim 11, wherein the initialization operations comprise causing the local platform to run a thread that detects online insertion and removal events at the network switching unit.

13. The computer-implemented method of claim 11, wherein the initialization operations comprise loading a local database into memory, the memory comprising the local storage.

14. The computer-implemented method of claim 1, wherein the local platform runs on the one or more processing chips.

15. The computer-implemented method of claim 1, wherein obtaining the SerDes parameters and the transceiver parameters is performed in response to receiving an indication of a cable insertion event at the port.

16. The computer-implemented method of claim 1, wherein the one or more processing chips are included in an application-specific integrated circuit of the network switching unit.

17. A network switching unit processing system comprising:
one or more processors; and
one or more non-transitory, computer-readable storage media storing instructions that, when executed by the one or more processors, cause the one or more processors to perform operations comprising:
receiving port parameters corresponding to a port of a network switching unit, wherein the network switching unit processing system is communicatively coupled to an application-specific integrated circuit that is communicatively coupled to a transceiver communicatively coupled to the port;
obtaining, from a local storage, based on the port parameters, (i) serializer/deserializer (SerDes) parameters corresponding to the port, and (ii) transceiver parameters corresponding to the port;
configuring signal processing operations of a SerDes unit of the application-specific integrated circuit using the SerDes parameters; and
providing, to a local platform of the network switching unit, the transceiver parameters for configuration, using the transceiver parameters, of the transceiver.

18. A network switching unit, comprising:
a port;
a transceiver communicatively coupled to the port;
an application-specific integrated circuit communicatively coupled to the transceiver, the application-specific integrated circuit comprising a SerDes unit; and
a network switching unit processing system, wherein the port, the transceiver, the network switching unit processing system, and the application-specific integrated circuit are together configured to perform operations comprising:
receiving, at the network switching unit processing system, port parameters corresponding to the port;
obtaining, at the network switching unit processing system, from a local storage, based on the port parameters, (i) serializer/deserializer (SerDes) parameters corresponding to the port, and (ii) transceiver parameters corresponding to the port;
configuring first signal processing operations of the SerDes unit of the application-specific integrated circuit using the SerDes parameters;
configuring second signal processing operations of the transceiver using the transceiver parameters;
performing, according to the SerDes parameters, using the SerDes unit, the first signal processing operations on a signal received at the SerDes unit from the transceiver or on a signal transmitted from the SerDes unit to the transceiver; and
performing, according to the transceiver parameters, using the transceiver, the second signal processing operations on a signal received at the transceiver from the SerDes unit or on a signal received at the transceiver from an external device.

19. The network switching unit of claim 18, wherein the first signal processing operations comprise at least one of converting a stream of parallel data to a stream of serial data or converting the stream of serial data to the stream of parallel data.

20. The network switching unit of claim 18, wherein the second signal processing operations comprise at least one of transmitting the signal received at the transceiver from the SerDes unit using a laser of the transceiver, or detecting the signal received at the transceiver from the external device using a photodetector of the transceiver.

* * * * *